United States Patent [19]

Acharekar et al.

[11] 4,445,217

[45] Apr. 24, 1984

[54] LASER APPARATUS AND METHOD

[75] Inventors: M. A. Acharekar, Orlando; M. M. Kaplan, Winter Park, both of Fla.

[73] Assignee: International Laser Systems, Inc., Orlando, Fla.

[21] Appl. No.: 319,182

[22] Filed: Nov. 9, 1981

[51] Int. Cl.$^3$ .............................................. H01S 3/04
[52] U.S. Cl. ...................................... 372/35; 372/53; 372/33; 372/40; 372/69
[58] Field of Search ...................... 372/53, 51, 54, 69, 372/72, 39; 378/35, 34, 70, 80, 33, 41, 40

[56] References Cited

U.S. PATENT DOCUMENTS 3,619,808 11/1971 Tomkins et al. .................. 372/35
4,150,341 4/1979 Ferguson ........................... 372/33

OTHER PUBLICATIONS

Bhaw alkar et al., "Improving the Pumping Efficiency of a Nd$^3$ Glass Laser Using Dyes", *IEEE Jour. Quant. Elec.* vol. QE-9, No. 1, Jan. 1973.

*Primary Examiner*—William L. Sikes
*Assistant Examiner*—Léon Scott, Jr.
*Attorney, Agent, or Firm*—William M. Hobby, III

[57] ABSTRACT

A laser cooling system has a coolant formulated to act as a heat exchanger and a transparent optical medium of matching refractive index between the flashlamp, silver reflectors and laser rod. The coolant has one or more fluorescent dyes and an inorganic pH buffering additive therein and the lamp is in a cerium doped envelope. A method is provided for measuring the operation time of a laser having a cooling system and a coolant having fluorescent dyes therein and actuating a solenoid valve after a predetermined operational life of the laser to release a dye additive into the coolant to maintain the efficiency of the laser.

17 Claims, 3 Drawing Figures

LASER APPARATUS AND METHOD

BACKGROUND OF THE INVENTION

The present invention relates to lasers and especially to lasers having a specially formulated coolant having fluorescent dyes therein and the method and apparatus for replacing decomposed dye.

In the past, it has been suggested that the efficiency of a neodymium (Nd) glass laser pumped by a xenon flashlamp can be improved by the circulation of fluorescent dyes between the laser rod and the flashlamp. The fluorescent dyes were used to absorb in the spectral region in which the Nd ions do not absorb and to fluoresce strongly at one of the pump bands of the laser rod. Prior art tests in this area have indicated a more efficient utilization of the flashlamp output. The use of a dye solution in place of the normal flashlamp/laser rod coolant results in an improvement in the efficiency of the overall electrical to laser output. This improved energy conversion can be used to maintain the existing energy input to the flashlamp if higher laser output is needed or to reduce the energy to the flashlamp so as to have the same laser output with a lower demand for electrical energy. The reduction and input power reduces the heat loading on the system and can markedly extend the useful life of the flashlamp.

A mixture of ethylene glycol and water is normally used as a coolant in a neodymium yttrium aluminum garnet, or Nd:YAG, laser system. The coolant has been proven adequate for the thermal load of the laser system and it functions not only as a heat exchanger, but also as a transparent optical medium of matchiing refractive index between the flashlamp, silver reflector and laser rod. The coolant as currently designed will not enhance flashlamp output by itself, and in fact, contamination of the coolant by inorganic or organic molecules can reduce laser output by absorbing visible flashlamp output energy in the Nd:YAG absorption band. The absorption spectrum of Nd:YAG is only a small fraction, or approximately eight percent (8%), of the input energy to the lamp and is absorbed by the laser rod. The remaining energy is wasted as heat and is removed by the coolant from the pumping cavity to the heat exchanger. The coolants used in the Nd:YAG lasers have a number of problems which the current invention is directed at improving.

Coolant acidification due to ultraviolet light from the flashlamp results in chemical corrosion of oxidizable metals such as brass, nickel, stainless steel and aluminum. In addition, coolant coloration will absorb some of the main Nd:YAG pump bands from the flashlamp to the rod reducing the laser output. Finally, flocculent turbidity coats the rod, lamp and reflectors and causes the light scattering which reduces the laser output and requires frequent costly maintenance.

The prior art used of fluorescent dyes is discussed in the journal of Quantum Electronics, Volume QE9, No. 1, January, 1973, starting on page 43, entitled "Improving the Pumping Efficiency of $Nd^3$ Glass Laser Using Dyes". The following U.S. Pat. Nos. are also cited as of interest: 3,079,347 to C. G. B. Garrett, et al.: 3,174,938 to R. R. Soden, et al.; 3,417,345 to A. Y. Cabezas, et al.; 3,729,690 to E. Snitzer; 3,813,613 to H. G. Danielmeyer, et al.; 3,999,145 to J. J. Gilman, et al.; 4,081,761 to N. T. Melamed, et al.; and 4,163,199 to C. E. Treanor.

SUMMARY OF THE INVENTION

A laser apparatus is provided having a power supply, a laser rod, a laser lamp, cooling system and reflectors. The laser cooling system circulates coolant fluid between a laser flashlamp and a laser rod for cooling the flashlamp and rod. The laser coolant fluid in the laser cooling system is selected to act as a transparent optical medium and a predetermined refractive index between the flashlamp and laser rod and includes at least one fluorescent dye additive therein. The power supply is connected to the flashlamp for actuating the lamp for the operation of the laser. For the mixture of two dye additives, a system for measuring the operation time of the laser, such as a pulse counter connected to the pulse generator of the power supply, continuously totals the operative time of the laser. For a single dye additive, a detector cell monitors the dye concentration, The dye additive system is provided for adding additional fluorescent dyes to the coolant in the cooling system, responsive to predetermined operational time or concentration measured by the pulse counter or the detector cell and may operate by actuating a solenoid valve to inject additional fluorescent dye into the coolant. A flashlamp having a cerium doped envelope provides longer life to the coolant and dye, and the inorganic buffer additive inhibits the coolant acidification. Two dyes selected as coolant additives are:

Rhodamine 6G (ethyl o-[6-(ethylamino)-3-(ethylimino)-2,7-dimethyl-3H-xanthen-9-yl] benzoate tetrafluoroborate); and DOTC iodide (3-ethyl-2-[7-(3-ethyl-2-benzoxazolinylidene)-1,3,5-heptatrienyl] benzoxazolium iodide).

A method is also provided in a laser, in accordance with the apparatus, for maintaining the dye additive in the coolant and includes the step for measuring the operational time of the laser with a pulse counter, or the like, actuating a solenoid valve after a predetermined operation time of the laser for injecting additional fluorescent dyes to the laser cooling system.

BRIEF DESCRIPTION OF THE DRAWINGS

Other objects, features and advantages of the present invention will be apparent from the written description and the drawings, in which.

DESCRIPTION OF THE PREFERRED EMBODIMENTS

The present invention uses a specially formulated coolant and cooling system to improve the efficiency of a laser system.

Fluorescent dyes are used as additives in the coolant. The dye in the coolant, when exposed to radiation from the flashlamp, converts a portion of unwanted flashlamp output into the desired Nd:YAG absorption spectrum. This results in improved Nd:YAG laser rod pumping. Two dyes successfully used as coolant additives are as follows: Rhodamine 6G (Rh-6G) and 3,3' Diethyloxatricarnocynanine Iodide (DOTC Iodide). It is also anticipated that other dyes will be utilized in the coolant without departing from the spirit and scope of the invention.

An inorganic buffer additive is added to the coolant to inhibit acidification. Sodium tetra-borate is used and provides a high buffering capacity, i.e. approximately twenty-five percent (25%) of the ethylene glycol would have to oxidize before a critical pH change would occur. The major reaction of the chemical buffering is as follows:

The UV light and heat oxidizes ethylene glycol to glycolic acid as the principal carboxylic acid.

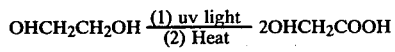

An excess of borate is added to maintain the reaction.

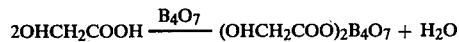

AT pH7, the following equilibrium exists:

$$K_{equib} = \frac{(glycolic\ acid)\ (borate)}{(glycoborate\ ester)}$$

A cerium doped envelope flashlamp is used to avoid exposing the coolant and the dye additives to ultraviolet light. This provides a longer life to the coolant and to the dye.

The laser in accordance with the present invention uses a coolant circulation system to provide a continuous supply of additive dye. The additive dye or dyes in a coolant provide only a limited number of lamp flashes before the dye decomposes because of the high temperature and ultraviolet light from the flashlamp. The addition of fresh additive dyes injected into the coolant, monitored by the number of flashes of the lamp, enables the laser to maintain its efficiency by the maintenance dye.

Figure 1:
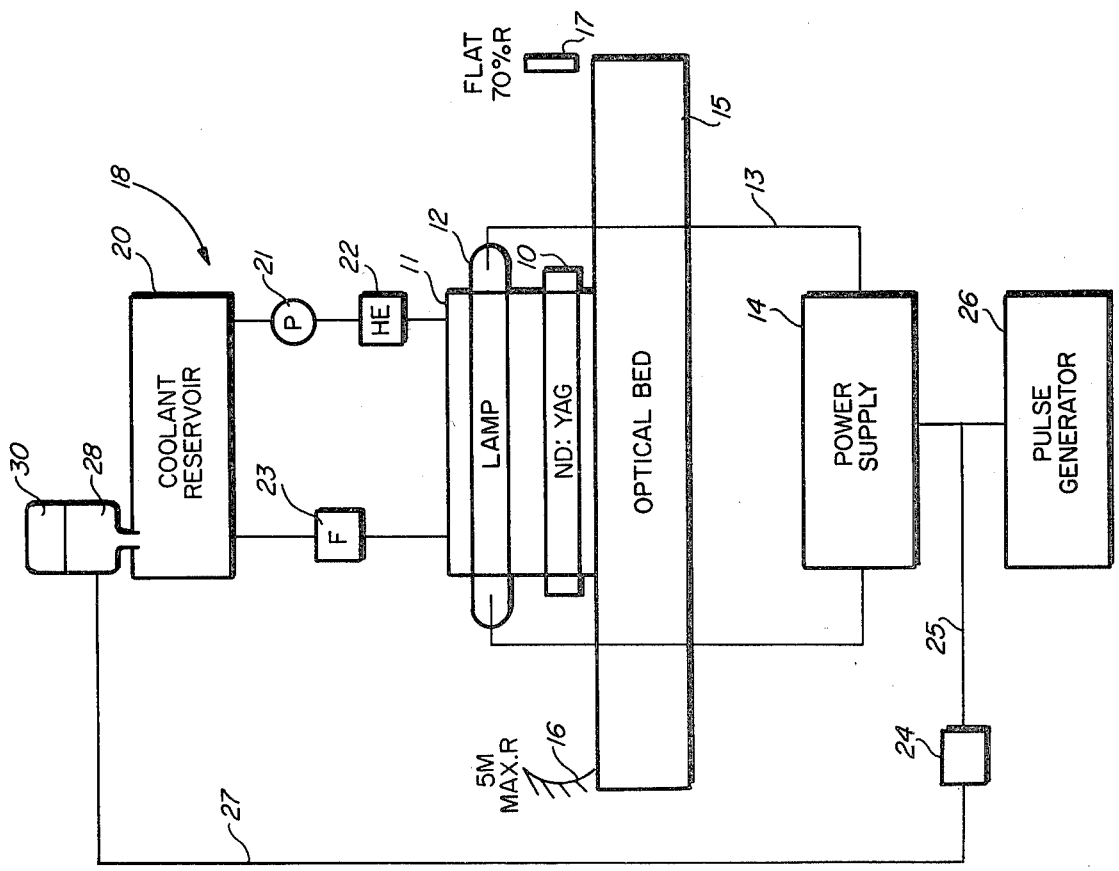
FIG. 1 is a block diagram of a laser system, in accordance with the pulse counter, to measure the dye coolant operational life.

Referring to FIG. 1 of the drawings, a block diagram of a laser in accordance with the present invention is illustrated having a lamp 12 mounted in the housing 11. The lamp 12 shall be a xenon gas filled in a cerium doped lamp envelope to reduce ultraviolet light and may have its electrodes connected through electrical lines 13 to a power supply 14 which supplies the power in flashes to the lamp directed towards the laser rod 10 and by reflections by a mirrored surface into the laser rod. The laser is mounted upon an optical bed 15 and might have a mirrored surface 16 at one end and a partially mirrored surface 17 at the other to form the lasing cavity. The laser has a coolant system 18 which includes a coolant reservoir 20, a coolant pump 21, a heat exhanger 22 for removing heat from the coolant and a filter 23, and is connected to the laser housing 11. The coolant fills the laser housing around the lamp and laser rod and is pumped by the pump 21 from the housing 11 through the heat exchanger 22 into the coolant reservoir 20, back through the filter 23 and into the housing 11, continuously circulating the coolant, filtering it and removing heat through the heat exchanger. A pulse counter 24 is connected by a line 25 to the output of a pulse generator 26 which is part of the power supply 14. The pulse generator generates the pulse driving power in the lamp 12 so that each pulse generated from the pulse generator 26 would fire the lamp 12 once. The pulse counter 24 counts each pulse. such as one million pulses, can produce an electrical output through the line 27 connected to a solenoid valve 28. The solenoid valve has a dye container which holds a concentrated fluorescent dye in the dye container 30, so that when the solenoid 28 is actuated, the dye in the container 30 is dumped into the coolant reservoir 20. The laser system in accordance with FIG. 1 is directed to add dye, when the fluorescent dye in the coolant has faded to a predetermined level, whereby additional dye is then required. Inasmuch as all organic dyes fade to some degree under the intense heat and light conditions, the laser coolant will then be subjected to the added dye maintaining the efficiency of the laser without having to overhaul the laser, remove, clean and replace the coolant in the cooling system.

Figure 2:
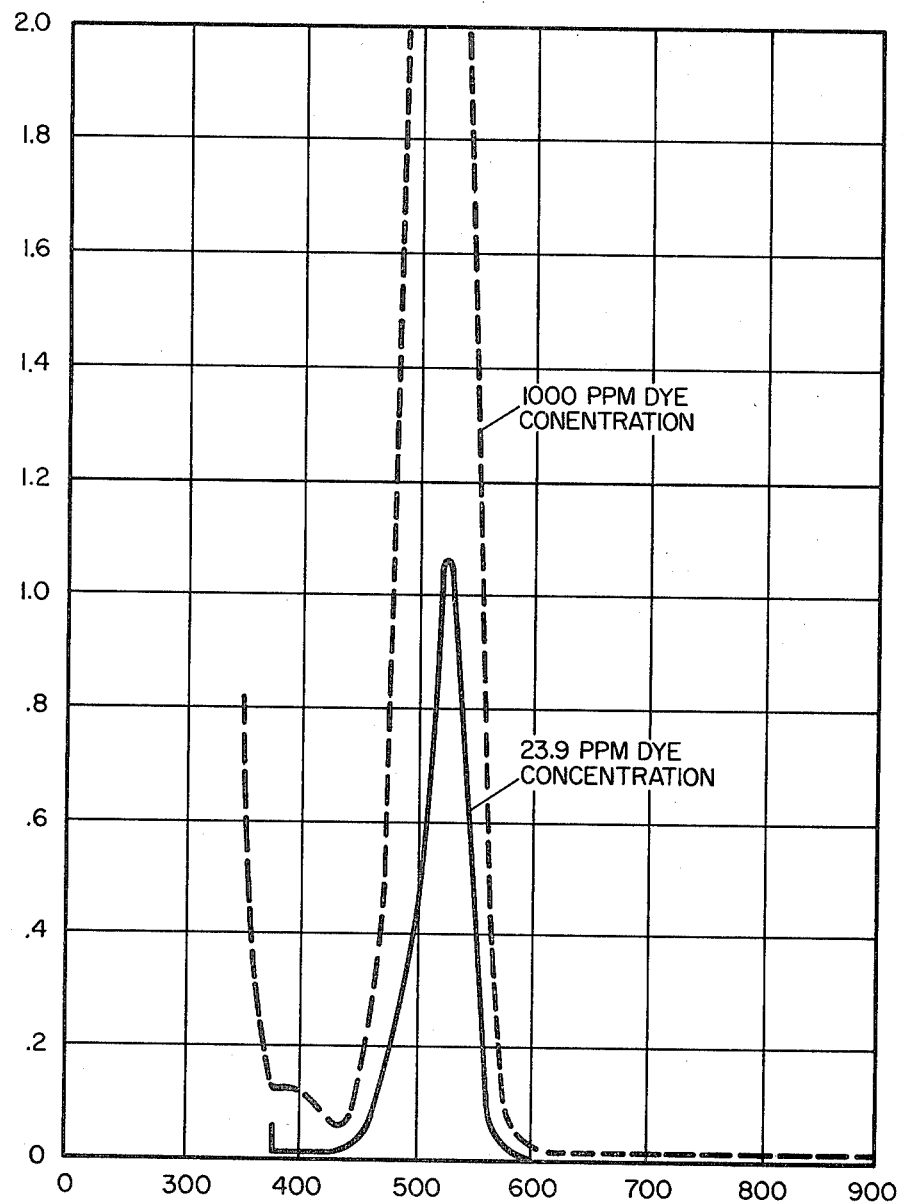
FIG. 2 is the spectral response for the coolant with Rhodamine 6G as an additive.

In FIG. 2, a spectral response for the coolant with Rhodamine 6G as an additive is shown with the "X" or horizontal axis having the wavelengths (0-900) in nanometers (nm) and the "Y" or vertical axis the absorbency (0-2A), where 0 absorbence = 100% transmittance and 2 absorbence = 1% transmittance. This absorption property of the coolant is utilized in a cell to measure the dye concentration in FIG. 3. Thus, the method for obtaining the operational life for a single dye is different from the mixture of dyes.

The dye and coolant, however, in the present laser have a much longer life initially as a result of the use of the cerium doped envelope flashlamp and inorganic buffering additive in the coolant. Ultraviolet light is well known for its effect upon organic dyes and the use of a cerium doped envelope lamp, which blocks a larger portion of the ultraviolet than the conventional lamp enhances the life of the dyes. The coolant in the present invention can be an alcohol, such as ethanol or ethylene glycol, modified with one or more dyes in pH buffered borax.

Preliminary data indicates that the use of 25 parts per million Rh-6G dye in a 50:50 water and ethylene glycol coolant will provide a forty percent (40%) increase in the output with a xenon gas filled lamp and that this is improved to approximately fifty percent (50%) increase in the output of the laser when a cerium doped envelope lamp using xenon gas is utilized. However, it is anticipated that a much greater increase in the efficiency of a laser can be expected as the system is optimized. The typical laser coolant consists of the following components:

50% ethylene glycol;
50% of a 1% weight/volume, sodium tetraborate aqueous solution (deionized water).

In this laser coolant, a minimum of 25 parts per million dye additive concentration will be maintained.

Figure 3:
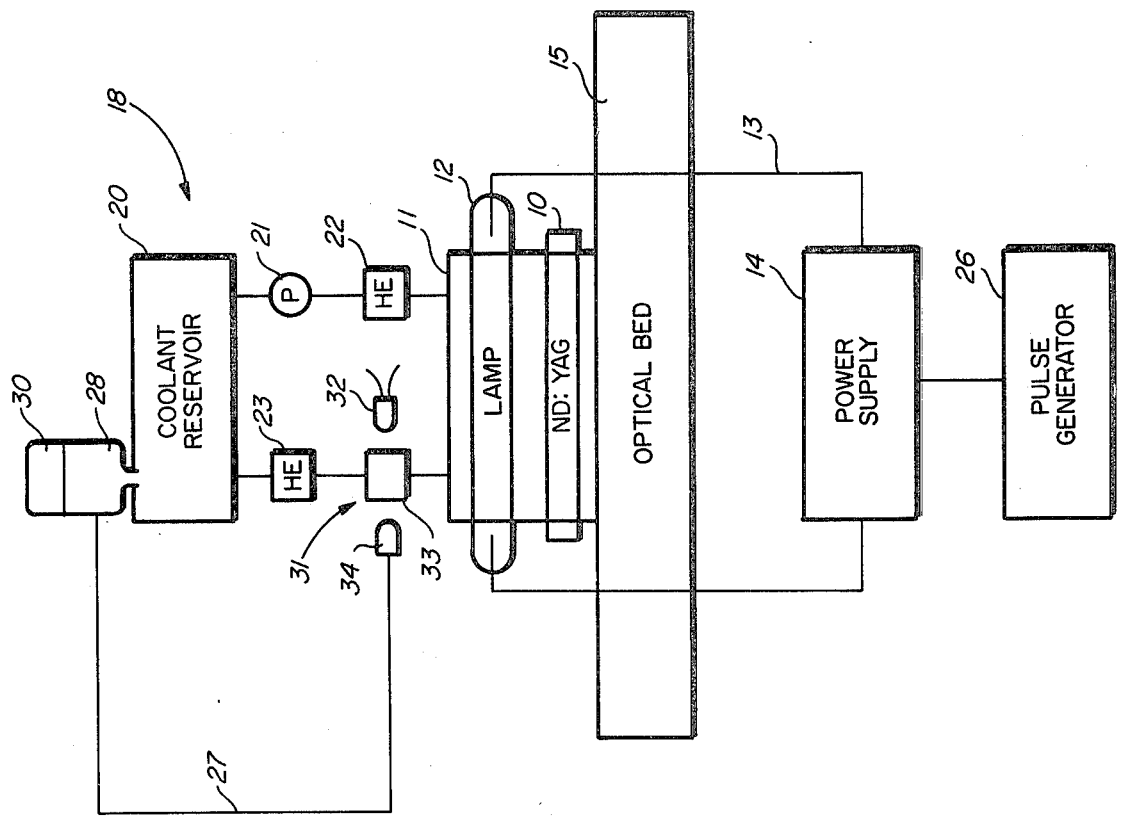
FIG. 3 is a block diagram of a laser system, in accordance with the detector cell, to measure dye concentration.

Referring to FIG. 3, a laser similar to that shown in FIG. 1 is illustrated having a pulse generator 26 connected to the power supply 14 connected to the line 13 to the flashlamp 12, and having an Nd:YAG rod 10 mounted adjacent to the optical bed 15. The laser housing 11 is connected to the heat exchanger 22, the pump 21 and to the coolant reservoir 20 of a coolant system 18, and back through the filter 23 into the housing 11. The cooling system in this Figure, as in FIG. 1, is a sealed cooling system for avoiding the coolant contact with air so that the only oxidation of the coolant is due to the ultraviolet light and heat from the laser flashlamp 12. The coolant reservoir has a solenoid 28 and dye container 30 connected thereto and is connected through an electrical line 27 to an optical detector 31 having an LED or other light source 32 mounted on one side of a cell 33 facing the detector 34. The photocell detector can read the transparency of the dye and detect when the dye has faded to a predetermined level to then switch the solenoid 28 to add concentrated dye to the coolant.

In operation, desired concentration of fluorescent dye in the coolant can be maintained by an in-line photocell in the cooling system containing a light source such as an LED providing light at the peak absorption wave length of the dye. As seen in FIG. 2 for Rhoadamine 6G, an LED will provide 530 nm light output. The cell detector triggers the solenoid 28 when the detector output falls below the present absorption value.

Accordingly, the present invention is not to be construed as limited to the forms shown, which are to be considered as illustrative rather than restrictive.

We claim:

1. A cooling system for a laser comprising in combination:
    a laser cooling system for circulating coolant fluid between a laser flashlamp and an active laser rod for cooling the flashlamp and laser rod;
    the coolant fluid in said laser cooling system being selected to act as a transparent optical medium of predetermined refractive index between said flashlamp and laser rod, said coolant fluid including at least one fluorescent dye added therein;
    means to measure the operating time of a laser being cooled by the laser cooling system; and
    a dye additive means connected to said means to measure the operational time of said laser for adding fluorescent dye to said coolant upon lapse of a predetermined operation time of said laser, whereby decomposed dye is replaced by the added dye.

2. A laser cooling system in accordance with claim 1, in which said coolant has ethylene glycol and a fluorescent dye therein.

3. A laser cooling system in accordance with claim 1, in which the coolant fluid has Rhodamine 6G (Rh-6G) dye added thereto.

4. A laser cooling system in accordance with claim 1, in which said coolant fluid has 3,3' Diethyloxatricarnocynanine Iodide (DOTC Iodide) therein.

5. A laser cooling system in accordance with claim 1, in which said means to measure the operating time of said laser includes a pulse counter connected to a pulse generator output in said power supply for counting the laser lamp pulses.

6. A laser cooling system in accordance with claim 5, in which said pulse counter is connected to said dye additive means for actuating said dye additive means to inject dye into said laser cooling system.

7. A laser cooling system in accordance with claim 6, in which said dye additive means has a solenoid valve connected between a dye container and said cooling system, whereby actuating of said solenoid valve will direct dye into said coolant fluid in said laser cooling system.

8. A laser cooling system in accordance with claim 1, in which the laser flashlamp has a cerium doped lamp envelope.

9. A laser cooling system in accordance with claim 8, in which said cerium doped flashlamp envelope is filled with xenon gas.

10. A laser cooling system in accordance with claim 1, in which the coolant fluid in the laser cooling system has an inorganic buffer additive therein.

11. A laser cooling system comprising in combination:
    a laser cooling system for circulating coolant fluid between a laser flashlamp and an active laser rod for cooling the flashlamp and laser rod;
    the coolant fluid in said laser cooling system having at least one fluorescent dye therein;
    means to measure fading of said fluorescent dye in said coolant fluid; and
    dye additive means connected to said means to measure fading of said fluorescent dye for adding fluorscent dye when said measuring means falls below a preset absorption value.

12. A laser cooling system in accordance with claim 11, in which said means to measure fading of fluorescent dye in said coolant has a light source producing light at the absorption wave lengths of said fluorescent dyes, said light source being mounted to direct light through coolant fluid in said cooling system and said means to measure fading also having a light detector mounted to receive light passing through said coolant and being connected to said dye additive means for adding fluorescent dye when said light detector output falls below a preset absorption value.

13. A laser cooling system in accordance with claim 12, in which said dye additive means has a solenoid valve connected between a dye container and a sealed cooling system, whereby actuation of said solenoid valve will direct dye into said coolant fluid in said laser cooling system.

14. A laser cooling system in accordance with claim 13, in which said means to measure the fading of fluorescent dye has a light emitting diode providing light at the peak absorption wave length of the fluorescent dye in said coolant fluid.

15. A laser cooling system in accordance with claim 14, in which said light emitting diode has a light output of 530 nanometers and said coolant fluid in said laser cooling system has Rhodamine 6G dye added thereto.

16. In a laser system having an Nd:YAG rod, and a flashlamp driven by a power supply, and having the Nd:YAG rod mounted in a housing with the flashlamp and cooling system connected to the housing for cooling the flashlamp and having the laser rod positioned in a resonator cavity, a method comprising the steps of:
    counting the operating time of the laser using a pulse counter to measure the number of flashes of a flashlamp;
    actuating a dye injection system for injecting a fluorescent dye into the cooling system responsive to measurement of a predetermined number of pulses of the pulse counter; and
    injecting a fluorescent dye into a sealed laser cooling system with the dye injection system to avoid coolant contact with air, whereby oxidation of the coolant is limited to the ultraviolet light and heat of the laser flashlamp.

17. A cooling system for a laser having a Nd:YAG laser rod and a cerium doped fused silica envelope flashlamp filled with xenon gas comprising:
    a cerium doped fused silica envelope flashlamp;
    a cooling system for circulating a coolant between the flashlamp and the laser rod; and
    the coolant in said cooling system having a fluorescent dye and an inorganic pH buffer therein.

* * * * *